(12) United States Patent
Li

(10) Patent No.: US 12,539,749 B2
(45) Date of Patent: Feb. 3, 2026

(54) DRIVE SYNTHESIS BOX WITH MULTI-MOTORS FLEXIBLE TORQUE AND ELECTRIC VEHICLE

(71) Applicants: ZHEJIANG GEELY HOLDING GROUP CO., LTD., Hangzhou (CN); ZHEJIANG GEELY FARIZON NEW ENERGY COMMERCIAL VEHICLE GROUP CO., LTD., Hangzhou (CN)

(72) Inventor: Shufu Li, Hangzhou (CN)

(73) Assignees: ZHEJIANG GEELY HOLDING GROUP CO., LTD., Hangzhou (CN); ZHEJIANG GEELY FARIZON NEW ENERGY COMMERCIAL VEHICLE GROUP CO., LTD., Hangzhou (CN)

( * ) Notice: Subject to any disclaimer, the term of this patent is extended or adjusted under 35 U.S.C. 154(b) by 327 days.

(21) Appl. No.: 18/315,015

(22) Filed: May 10, 2023

(65) Prior Publication Data
US 2023/0278409 A1    Sep. 7, 2023

Related U.S. Application Data

(63) Continuation of application No. PCT/CN2020/138038, filed on Dec. 21, 2020.

(30) Foreign Application Priority Data

Nov. 10, 2020   (CN) .......................... 202011246947.2

(51) Int. Cl.
*B60K 1/02*        (2006.01)
*B60K 17/16*       (2006.01)

(52) U.S. Cl.
CPC ................ *B60K 1/02* (2013.01); *B60K 17/16* (2013.01)

(58) Field of Classification Search
CPC .................................. B60K 1/02; B60K 17/16
See application file for complete search history.

(56) References Cited

U.S. PATENT DOCUMENTS 9,822,860 B2 * 11/2017 Kaltenbach ............. B60K 1/00
10,968,994 B2 * 4/2021 Mittelberger ........... B60K 1/00
(Continued)

FOREIGN PATENT DOCUMENTS

CN    201777126 U    3/2011
CN    106080155 A    11/2016
(Continued)

OTHER PUBLICATIONS

First Office Action issued in counterpart Russian Patent Application No. 2023112896, dated Nov. 2, 2023.
(Continued)

*Primary Examiner* — Jacob B Meyer
(74) *Attorney, Agent, or Firm* — Westbridge IP LLC

(57) ABSTRACT

Disclosed are a drive synthesis box with multi-motors flexible torque and an electric vehicle. The drive synthesis box with multi-motors flexible torque includes at least two power sources and at least two reduction gear assemblies. Each power source includes driving motors for outputting driving force. The at least two reduction gear assemblies are connected to the at least two power sources in one-to-one correspondence, for transmitting the driving force.

11 Claims, 4 Drawing Sheets

(56) References Cited

U.S. PATENT DOCUMENTS

| | | | | |
|---|---|---|---|---|
| 11,623,511 B2* | 4/2023 | Yu | ............................ | F16H 3/089 74/331 |
| 2010/0173746 A1* | 7/2010 | Ideshio | .................. | B60W 10/11 477/36 |
| 2013/0160587 A1* | 6/2013 | Ibamoto | ..................... | F16H 3/08 74/331 |
| 2014/0332301 A1 | 11/2014 | Knoblauch et al. | | |
| 2015/0306955 A1 | 10/2015 | Knoblauch et al. | | |
| 2015/0375750 A1* | 12/2015 | Toyota | .................... | F16H 61/16 701/48 |
| 2016/0017958 A1* | 1/2016 | Wu | .......................... | F16H 3/006 74/665 D |
| 2017/0037936 A1* | 2/2017 | Park | .......................... | F16H 3/089 |

FOREIGN PATENT DOCUMENTS

| | | | | |
|---|---|---|---|---|
| CN | 206336116 U | | 7/2017 | |
| CN | 207173300 U | * | 4/2018 | |
| CN | 108297736 A | | 7/2018 | |
| CN | 108340760 A | | 7/2018 | |
| CN | 208134053 U | | 11/2018 | |
| CN | 109263454 A | | 1/2019 | |
| CN | 109519505 A | | 3/2019 | |
| CN | 109649147 A | | 4/2019 | |
| CN | 109854700 A | | 6/2019 | |
| CN | 110126604 A | * | 8/2019 | ............... B60K 1/02 |
| CN | 209320658 U | | 8/2019 | |
| CN | 111114268 A | | 5/2020 | |
| CN | 210652645 U | | 6/2020 | |
| CN | 211335435 U | | 8/2020 | |
| CN | 112477570 A | | 3/2021 | |
| JP | 2015507568 A | | 3/2015 | |
| JP | 2017206074 A | | 11/2017 | |
| KR | 20090063461 A | | 6/2009 | |
| KR | 20190068961 A | | 6/2019 | |
| RU | 2623375 C2 | | 6/2017 | |

OTHER PUBLICATIONS

First Office Action issued in counterpart Chinese Patent Application No. 202011246947.2, dated Jul. 21, 2021.

International Search Report and Written Opinion issued in corresponding PCT Application No. PCT/CN2020/138038, dated Jul. 26, 2021.

Notification to Grant Patent Right for Invention issued in counterpart Chinese Patent Application No. 202011246947.2, dated Mar. 2, 2023.

Second Office Action issued in counterpart Chinese Patent Application No. 202011246947.2, dated Jan. 26, 2022.

Extended European Search Report issued in counterpart European Patent Application No. 20961418.9, dated Sep. 5, 2024.

Notice of Reasons for Refusal issued in counterpart Japanese Patent Application No. 2023-550338, dated Aug. 6, 2024.

* cited by examiner

US 12,539,749 B2

DRIVE SYNTHESIS BOX WITH MULTI-MOTORS FLEXIBLE TORQUE AND ELECTRIC VEHICLE

CROSS-REFERENCE TO RELATED APPLICATIONS

This application is a continuation application of International Application No. PCT/CN2020/138038, filed on Dec. 21, 2020, which claims priority to Chinese Patent Application No. 202011246947.2, filed on Nov. 10, 2020. The disclosures of the above-mentioned applications are incorporated herein by reference in their entireties.

TECHNICAL FIELD

The present disclosure relates to the technical field of vehicles, and in particular to a drive box combined with flexible torque of multi motors and an electric vehicle.

BACKGROUND

As the energy crisis and environmental pollution problems continue to intensify, countries around the world, especially China, as a big automobile country, are vigorously advocating and paying attention to the development of electric vehicles. Various companies have focused on the development of the electric driving system of electric vehicles. However, in the application field of vehicles with large loads, since the vehicles require a large output torque and a high maximum speed needs to be ensured, in most companies, the driving motor with a single large torque and a slow rotational speed needs to cooperate with a reduction device with a fixed speed ratio. In this way, not only the weight of the electric driving system is heavy and the manufacturing cost is high, but also the power performance of the vehicle at a medium or high speed is poor. In some companies, the multi-gear automated mechanical transmission (AMT) is used to replace the reduction device. In this way, although the power performance of the vehicle at a medium or high speed can be improved, the power interruptions caused by frequent gear shifts will still be caused, which will reduce comfort and further increase the system cost. In addition, once the motor fails, the vehicle cannot be driven normally.

SUMMARY

In view of the above problems, a drive box combined with flexible torque of multi motors and an electric vehicle which can overcome the above problems or at least partially solves the above problems are provided.

An object of the present disclosure is to provide a drive synthesis box with multi-motors flexible torque. The driving motor with multiple groups of small torques and a high rotational speed is provided in the drive synthesis box with multi-motors flexible torque. In this way, not only the large torque requirement under a low speed working condition can be met and the power performance of the vehicle at a medium or high speed can be ensured, but also the manufacturing cost can be reduced and the reliability of the electric driving system can be improved.

A further object of the present disclosure is to reduce power interruptions and sudden pauses during gear shifting as much as possible, to improve driving comfort by providing a two-gear transmission device in the drive synthesis box with multi-motors flexible torque.

In particular, according to an aspect of the embodiments of the present disclosure, a drive box combined with flexible torque of multi motors is provided. The drive box combined with flexible torque of multi motors includes:
  at least two power sources, each of the at least two power sources includes a driving motor for outputting a driving force; and
  at least two reduction gear assemblies connected to the at least two power sources in one-to-one correspondence, the two reduction gear assemblies are configured to transmit the driving force.

Further, the drive box combined with flexible torque of multi motors further includes a differential. An input end of the differential is connected to an output end of each reduction gear assembly, and an output end of the differential is respectively connected to a left driving shaft and a right driving shaft for transmitting the driving force to a wheel end, to drive a wheel of a vehicle.

Further, the drive box combined with flexible torque of multi motors further includes a transmission connecting the input end of the differential with the output end of each reduction gear assembly.

Further, each power source includes the driving motor and a motor shaft connected to the driving motor;
  each reduction gear assembly includes a first transmission gear connected to the motor shaft and a second transmission gear meshing with the first transmission gear. The second transmission gear is an output end of the reduction gear assembly.

Further, the at least two reduction gear assemblies share one of second transmission gears.

Further, the at least two power sources are provided along a circumference of the second transmission gear.

Further, the transmission includes an input shaft assembly, an intermediate shaft assembly, an output shaft assembly and a gear shift device,
  the input shaft assembly includes an input shaft connected to the second transmission gear and a third transmission gear connected to the input shaft, the intermediate shaft assembly includes an intermediate shaft, a fourth transmission gear and a fifth transmission gear, both ends of the intermediate shaft are respectively connected to the fourth transmission gear and the fifth transmission gear, and the fourth transmission gear meshes with the third transmission gear,
  the output shaft assembly includes an output shaft and a sixth transmission gear, the output shaft is connected to the input end of the differential, the sixth transmission gear is rotatably installed on the output shaft, and the sixth transmission gear meshes with the fifth transmission gear, and
  the gear shift device is provided on the output shaft and configured to control a connection between the output shaft and the sixth transmission gear or the input shaft.

Further, when the transmission operates in a first gear, the gear shift device is configured to control the output shaft to connect with the sixth transmission gear, to make the driving force transmitted from the reduction gear assembly sequentially pass through the input shaft, the third transmission gear, the fourth transmission gear, the intermediate shaft, the fifth transmission gear, the sixth transmission gear and the output shaft to the differential. When the transmission operates in a second gear, the gear shift device is configured to control the output shaft to connect with the input shaft, to make the driving force transmitted from the reduction gear assembly sequentially pass through the input shaft and the output shaft to the differential, to realize a two-gear driving of the vehicle.

Further, the at least two power sources are configured to work cooperatively or independently in a controlled manner.

Further, the at least two power sources are distributed in one of following manners:
  a forward arrangement, a backward arrangement and an opposite arrangement.

Further, the drive box combined with flexible torque of multi motors further includes at least one dual-motor controller, or at least one dual-motor controller and a single-motor controller, a number of the dual-motor controller and the single-motor controllers is determined according to a number of the driving motors.

According to an aspect of the embodiments of the present disclosure, an electric vehicle is provided. The electric vehicle includes According to another aspect of the embodiments of the present disclosure, there is also provided an electric vehicle, including the drive box combined with flexible torque of multi motors described in any one of the foregoing.

Further, the electric vehicle includes a pure electric heavy truck, a heavy truck with increased range, and a battery replacement heavy truck.

Further, the battery replacement heavy truck includes a battery replacement box, and the battery replacement box is quickly replaced through a battery replacement station.

Embodiments of the present disclosure provide a drive synthesis box with multi-motors flexible torque. The drive box combined with flexible torque of multi motors includes at least two power sources, and each of the at least two power sources include a driving motor. The driving force output from the power source is transmitted to the differential by the reduction gear assembly. Therefore, the driving force is transmitted to the vehicle axle through the differential, to drive the wheels to rotate. The driving motor with multiple groups of small torques and a high rotational speed is used to replace the existing driving motor with a single large torque and a low rotational speed. In this way, not only large torque requirements under a low speed working condition can be met and the power performance of the vehicle at a medium or high speed can be ensured, but also the manufacturing and procurement costs can be reduced. In addition, when a certain driving motor fails, the vehicle can still be driven normally through other driving motors, which improves the reliability of the electric driving system.

Further, the drive box combined with flexible torque of multi motors in the present disclosure is provided with a two-gear shift device, which can reduce power interruptions and sudden pauses during gear shifting as much as possible, to improve driving comfort. In addition, compared with the existing multi-gear AMT transmission, the drive box combined with flexible torque of multi motors in this embodiment can reduce cost.

Further, the at least two power sources are configured to work cooperatively or independently according to the vehicle working condition. In this way, not only the power performance of the vehicle can be met and the driving motor can work in the high efficiency zone, but also the power loss of the driving motor can be reduced and the efficiency of the electric drive system can be improved. Further, each driving motor is configured to operate in different time periods, which makes the accumulated damage of the driving motors shared between each driving motors, thereby reducing the failure rate of the driving motor.

Further, by combining and using an appropriate number of dual-motor controllers and single-motor controllers according to the number of driving motors, the manufacturing cost of the motor controller can be reduced.

The above description is only an overview of technical solutions of the present disclosure. In order to better understand technical solutions of the present disclosure, technical solutions of the present disclosure can be implemented according to the contents of the description, and to make the above and other objectives, features and advantages of the present disclosure more obvious and understandable, the specific embodiments of the present disclosure are described below.

Those skilled in the art will more understand the above and other objectives, advantages and features of the present disclosure according to the following detailed description of embodiments in the present disclosure with reference to the accompanying drawings.

BRIEF DESCRIPTION OF THE DRAWINGS

Some embodiments of the present disclosure will be described clearly with reference to the accompanying drawings in an illustration manner but not a limited manner. The same reference numerals in the drawings represent the same or similar components or parts. Those skilled in the art will understand that the drawings are not necessarily drawn to scale.

DETAILED DESCRIPTION OF EMBODIMENTS

Figure 1:
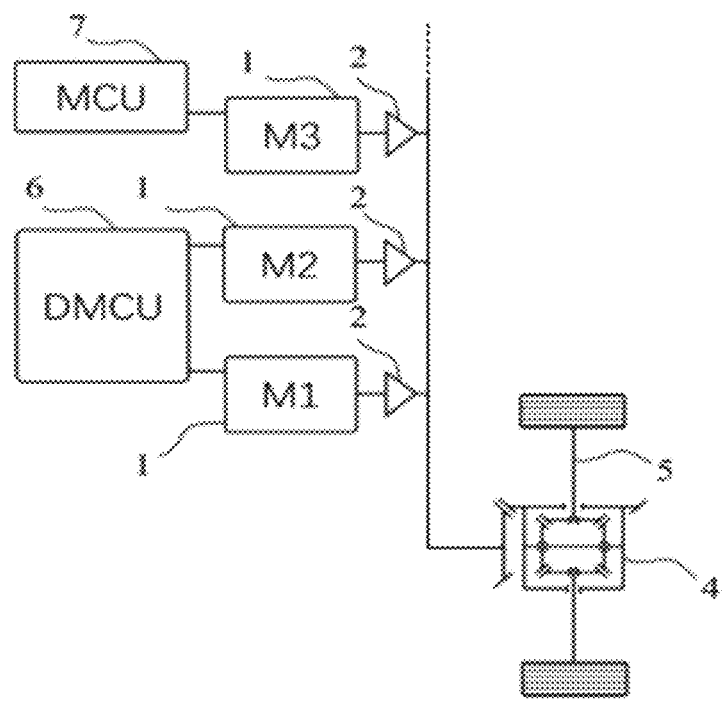
FIG. 1 is a schematic structural block view of a drive box combined with flexible torque of multi motors according to a first embodiment of the present disclosure.

The exemplary embodiments of the present disclosure will be described clearly in the following with reference to the accompanying drawings. Although exemplary embodiments of the present disclosure are shown in the drawings, it should be understood that the present disclosure may be implemented in various forms and should not be limited by the embodiments described herein. Rather, these embodiments are provided for more thorough understanding about the present disclosure, to fully convey the scope claimed in the present disclosure to those skilled in the art.

At present, in the vehicles with large loads, the motor with a low rotational speed, a large power and a large torque, needs to cooperate with the multi-gear automated mechanical transmission (AMT), thus, the cost of the electric driving system is high. Under most working conditions, the motor rotational speed in the whole vehicle is high, and the whole vehicle cannot keep in the high-efficiency zone all the time or in most cases, which makes the efficiency of the electric driving system low. In the multi-gear (such as 6 gears, 8 gears and 9 gears) AMT, not only the control logic is complex and the gear shift power is prone to be interrupted, but also the motor and the transmission are controlled by different controllers and the integration of components is low. In addition, since a single motor is used for driving, once the motor fails, the vehicle cannot continue driving, and the reliability of the electric driving system is low.

In order to solve or at least partially solve the above-mentioned technical problems, a drive box combined with flexible torque of multi motors is provided in an embodiment of the present disclosure. The technical solutions in the embodiments of the present disclosure will be clearly and completely described in the following with reference to the accompanying drawings of the first embodiment to the fourth embodiment.

The First Embodiment

Figure 2:
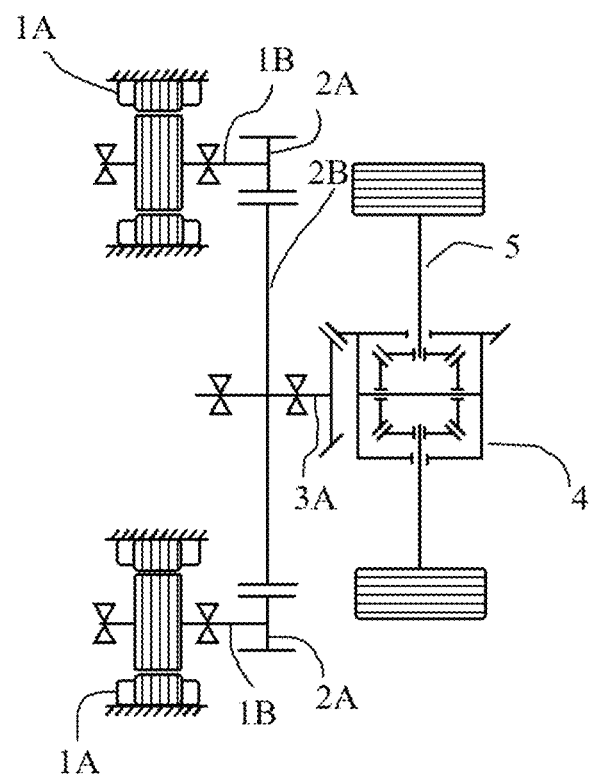
FIG. 2 is a schematic structural view of the drive box combined with flexible torque of multi motors according to the first embodiment of the present disclosure.
Figure 3:
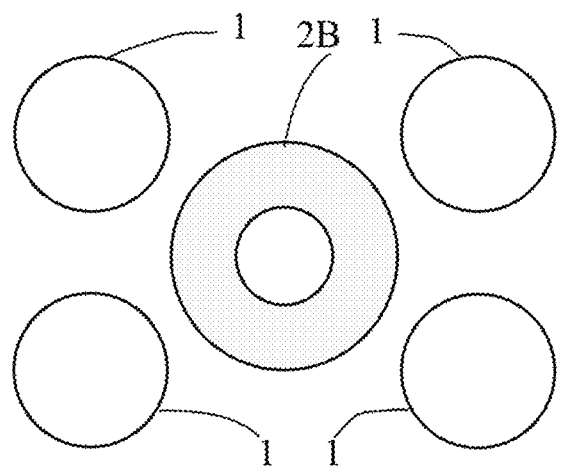
FIG. 3 is a schematic layout view of a driving motor according to the first embodiment of the present disclosure.

As shown in FIG. 1 to FIG. 3, the drive box combined with flexible torque of multi motors of this embodiment may at least include a power source 1 and a reduction gear assembly 2. Further, the drive box combined with flexible torque of multi motors may also include a differential 4.

The number of the power sources 1 is at least two, and each power source 1 includes a driving motor 1A for outputting the driving force. The performance and geometric dimensions of each driving motor 1A are the same, to simplify the control for the driving motor 1A. It should be noted that the number of power sources 1 in FIG. 1 to FIG. 3 is only schematic, and can be set according to actual vehicle application requirements. For example, the number of power sources 1 can be two, three, or even more. In a specific embodiment, the number of power sources 1 may be four. The number of reduction gear assemblies 2 may be the same as the power sources 1, and the reduction gear assembly 2 is connected to the power source 1 in one-to-one correspondence, to transmit the driving force. That is, each power source 1 is correspondingly connected to a reduction gear assembly 2. The input end of the differential 4 is connected to the output end of each reduction gear assembly 2, and the output end of the differential 4 is connected to the vehicle axle 5, to transmit the driving force to the vehicle axle 5 and drive the wheels of the vehicle. The vehicle axle 5 may include a left half shaft and a right half shaft. The left half shaft and the right half shaft, which are used as the driving shafts, are respectively connected to the wheels. The driving motor 1A with multiple groups of small torques and a high rotational speed is used to replace the driving motor with a single large torque and a low rotational speed. In this way, not only large torque requirements under a low speed working condition can be met and the power performance of the vehicle at a medium or high speed can be ensured, but also the manufacturing and procurement costs can be reduced. In addition, when a certain driving motor 1A fails, the vehicle can still be driven normally through other driving motors 1A, which improves the reliability of the electric driving system. Further, there is no need to set a transmission in this embodiment, which simplifies the control for the drive synthesis box with multi-motors flexible torque, and is especially suitable for vehicles with a low speed use requirements, thereby realizing a highest possible economical efficiency on the premise that the vehicle requirements are met.

As shown in FIG. 2, each power source 1 includes a driving motor 1A and a motor shaft 1B connected to the driving motor 1A. Each reduction gear assembly 2 includes a first transmission gear 2A connected to the motor shaft 1B and a second transmission gear 2B meshing with the first transmission gear 2A. The second transmission gear 2B is an output end of the reduction gear assembly 2. The driving motor 1A is connected to the first transmission gear 2A through the motor shaft 1B, then the driving motor 1A is connected to the differential 4 through the second transmission gear 2B. The driving force output by the driving motor 1A is transmitted to the differential 4 by a meshing between the first transmission gear 2A and the second transmission gear 2B.

The at least two reduction gear assemblies 2 may share one second transmission gear 2B. That is, each reduction gear assembly 2 includes a first transmission gear 2A and a shared second transmission gear 2B. In this way, the number of components can be reduced, and the volume of the drive box combined with flexible torque of multi motors can be reduced, thereby saving the layout space of the drive synthesis box with multi-motors flexible torque.

Further, in the case that two reduction gear assemblies 2 shares one second transmission gear 2B, the at least two power sources 1 can be provided along a circumference of the second transmission gear 2B. As shown in FIG. 3, multiple power sources 1 are distributed along the circumference with the second transmission gear 2B as the axis center. In this way, the structure of the drive box combined with flexible torque of multi motors is more compact, and the layout space of the drive box combined with flexible torque of multi motors can be further saved.

The at least two power sources 1 are configured to work cooperatively or independently according to the vehicle working condition. In this way, not only the power performance of the vehicle can be met and the driving motor 1A can work in the high efficiency zone, but also the power loss of the driving motor 1A can be reduced and the efficiency of the electric drive system can be improved. Further, each driving motor 1A is configured to operate in different time periods, which makes the accumulated damage of the driving motors 1A shared between each driving motors 1A, thereby reducing the failure rate of the driving motor 1A.

The at least two power sources 1 are distributed in a forward arrangement. The forward arrangement means that all the driving motors 1A are distributed in front of the reduction gear assembly 2. The forward arrangement can simplify the structures of the power source 1 and the reduction gear assembly 2, and can simplify the assembly between the power source 1 and the reduction gear assembly 2. The power sources 1 can be distributed in other ways, such as a backward arrangement, an opposite arrangement, and the like.

In addition, as shown in FIG. 1, the drive box combined with flexible torque of multi motors may include at least one dual-motor controller 6 (represented by DMCU in FIG. 1), or at least one dual-motor controller 6 and a single-motor controller 7 (represented by MCU in FIG. 1). The number of the dual-motor controllers 6 and the single-motor controllers 7 is determined according to the number of the driving motors 1A. The dual-motor controller 6 can respectively control the two motors through strategies. In practical applications, dual-motor controllers 6 should be used as much as possible. For example, if the number of driving motors 1A is even, all dual-motor controllers 6 may be used, and the number of dual-motor controllers 6 is half of the number of driving motors 1A. If the number of driving motors 1A is odd, a single-motor controller 7 can be used in addition to the dual motor controller 6. By combining and using an appropriate number of dual-motor controllers 6 and single-motor controllers 7 according to the number of driving motors 1A, the manufacturing cost of the motor controller can be reduced.

The Second Embodiment

Figure 4:
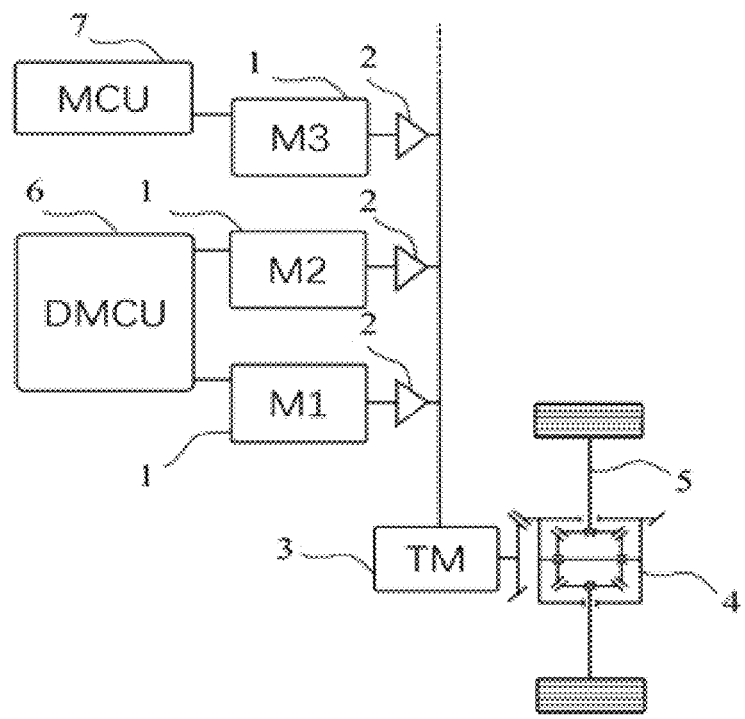
FIG. 4 is a schematic structural block view of the drive box combined with flexible torque of multi motors according to a second embodiment of the present disclosure.
Figure 5:
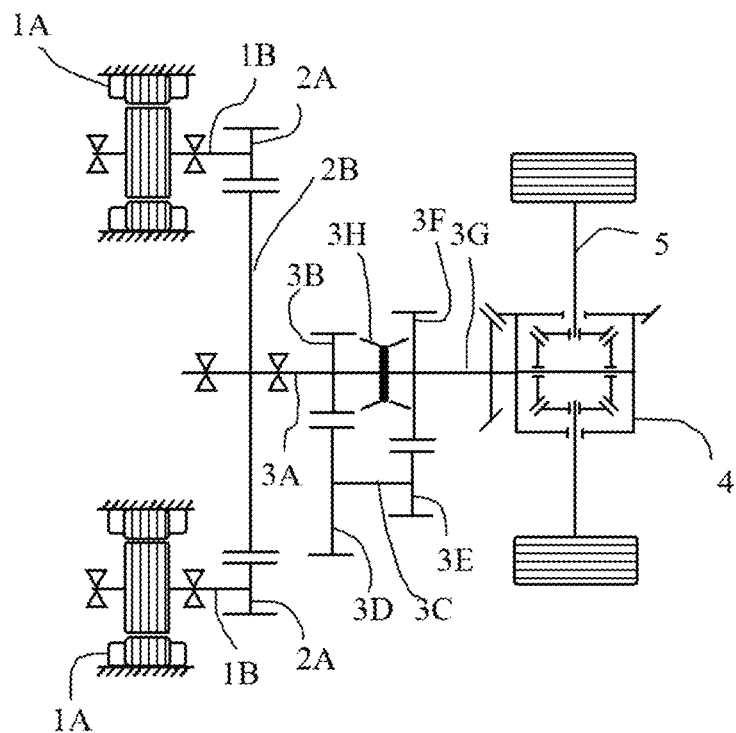
FIG. 5 is a schematic structural view of the drive box combined with flexible torque of multi motors according to the second embodiment of the present disclosure.

As shown in FIG. 4 and FIG. 5, the difference between the second embodiment and the first embodiment is that the drive box combined with flexible torque of multi motors further includes a transmission 3 connecting the input end of the differential 4 with the output end of each reduction gear assembly 2. In this case, the output end (namely the second transmission gear 2B) of each reduction gear assembly 2 is connected to the transmission 3, and is further connected to the input end of the differential 4 through the transmission 3.

The driving motor 1A, the reduction gear assembly 2, and the transmission 3 in this embodiment are all built with the inner casing of the transmission 3 as a carrier, thereby improving the component integration and making the structure of the drive box combined with flexible torque of multi motors more compact.

The transmission 3 includes an input shaft assembly, an intermediate shaft assembly, an output shaft assembly and a gear shift device 3H. The input shaft assembly includes an input shaft 3A connected to the second transmission gear 2B and a third transmission gear 3B connected to the input shaft 3A. The input shaft 3A and the third transmission gear 3B can be integrally formed, or connected to each other through splines. The intermediate shaft assembly includes an intermediate shaft 3C, a fourth transmission gear 3D and a fifth transmission gear 3E. Both ends of the intermediate shaft 3C are respectively connected to the fourth transmission gear 3D and the fifth transmission gear 3E, and the fourth transmission gear 3D meshes with the third transmission gear 3B. The fourth transmission gear 3D is connected to the intermediate shaft 3C through splines, an interference fit and a pressing fit. The fifth transmission gear 3E is connected to the intermediate shaft 3C through splines, an interference fit and a pressing fit. The output shaft assembly includes an output shaft 3G and a sixth transmission gear 3F. The output shaft 3G is connected to the input end of the differential 4, and the sixth transmission gear 3F is rotatably installed on the output shaft 3G. The sixth transmission gear 3F meshes with the fifth transmission gear 3E. The sixth transmission gear 3F is installed on the output shaft 3G through a needle bearing, and can rotate along the circumference of the output shaft 3G. The gear shift device 3H is provided on the output shaft 3G, and is configured to control the connection between the output shaft 3G and the sixth transmission gear 3F or the input shaft 3A. The gear shift device 3H can be installed on the output shaft 3G through splines or an interference fit. The gear shift device 3H can include a combination sleeve or a clutch in a dog tooth shape.

Based on the above structure, two gears, namely the first gear and the second gear, can be realized in the transmission 3. When the transmission 3 operates in the first gear, the gear shift device 3H is configured to make the output shaft 3G connected to the sixth transmission gear 3F, to make the driving force transmitted from the reduction gear assembly 2 sequentially pass through the input shaft 3A, the third transmission gear 3B, the fourth transmission gear 3D, the intermediate shaft 3C, the fifth transmission gear 3E, the sixth transmission gear 3F and the output shaft 3G to the differential 4. When the transmission 3 operates in the second gear, the gear shift device 3H is configured to make the output shaft 3G connected to the input shaft 3A, to make the driving force transmitted from the reduction gear assembly 2 sequentially pass through the input shaft 3A and the output shaft 3G to the differential 4, to realize a two-gear driving of the vehicle.

In this embodiment, the drive box combined with flexible torque of multi motors is provided with a two-gear shift device, which can reduce power interruptions and sudden pauses during gear shifting as much as possible, to improve driving comfort. In addition, compared with the existing multi-gear AMT transmission, the drive box combined with flexible torque of multi motors in this embodiment can reduce cost.

Based on four power sources 1 and the two-gear transmission 3, the working modes of the drive box combined with flexible torque of multi motors will be described clearly in the following.

During the actual running of the vehicle, eight different working modes driven by electricity will occur if four power sources 1 cooperate with the two-gear transmission 3 for operation. The relationship between each working mode, the gear of the transmission 3 and the power source 1 is shown in the table below.

| working mode | number of the driving motor | gear of the shift device |
|---|---|---|
| EV1 | 1 | 1 |
| EV2 | 1 | 2 |
| EV3 | 2 | 1 |
| EV4 | 2 | 2 |
| EV5 | 3 | 1 |
| EV6 | 3 | 2 |
| EV7 | 4 | 1 |
| EV8 | 4 | 2 |

When only one driving motor 1A is operating and the transmission 3 is in the first gear state, the working mode is defined as the first gear mode EV1 driven by electricity. The working mode EV1 is suitable for operating under conditions such as a no-load condition, flat roads, downhill roads with a little slope, or cruising at a low speed. In this working mode, power consumption can be saved. In addition, since the vehicle is driven by a single driving motor and other motors do not operate, the mechanical fatigue and damage can be reduced.

When only one driving motor 1A is operating and the transmission 3 is in the second gear state, the working mode is defined as the second gear mode EV2 driven by electricity. The working mode EV2 is suitable for operating under conditions such as a no-load condition, flat roads, or cruising at a high speed.

When two driving motors 1A are operating and the transmission 3 is in the first gear state, the working mode is defined as the third gear mode EV3 driven by electricity. The working mode EV3 is suitable for operating under conditions such as a no-load condition, starting on flat roads, or driving with light loads and low speeds.

When two driving motors 1A are operating and the transmission 3 is in the second gear state, the working mode is defined as the fourth gear mode EV4 driven by electricity. The working mode EV3 is suitable for operating under conditions such as a no-load or a light-load condition, flat roads, or cruising at a high speed.

When three driving motors 1A are operating and the transmission 3 is in the first gear state, the working mode is defined as the fifth gear mode EV5 driven by electricity. The working mode EV5 is suitable for operating under conditions such as a medium-load or a standard-load condition, starting, flat roads, or driving with a low speed.

When three driving motors 1A are operating and the transmission 3 is in the second gear state, the working mode is defined as the sixth gear mode EV6 driven by electricity. The working mode EV6 is suitable for operating under conditions such as a medium-load or a standard-load condition, flat roads, or driving with a low speed.

When four driving motors 1A operate simultaneously and the transmission 3 is in the first gear state, the working mode is defined as the seventh gear mode EV7 driven by electricity. The working mode EV7 is suitable for operating under conditions such as a full-load or an overload condition. Or the working mode EV7 is suitable for the vehicle with a low speed and a large torque to drive on uphill roads with a big slope or start. Under a full-load or an overload condition, the seventh gear mode EV7 can meet requirements of the vehicle with a large torque driving on uphill roads or starting.

When four driving motors 1A operate simultaneously and the transmission 3 is in the second gear state, the working mode is defined as the eighth gear mode EV8 driven by electricity. The working mode EV8 is suitable for operating under conditions such as a full-load or an overload condition, starting on flat roads, driving on uphill roads with a little slope, or cruising at a high speed.

In this embodiment, according to the requirements of the vehicle working conditions, multiple groups of driving motors can work cooperatively or independently. Multiple groups of driving motors can cooperate with different gears of the transmission. In this way, not only the vehicle power performance can be met and the driving motors can operate in the high efficiency zone, but also the power loss of the driving motors can be reduced and the efficiency of electric driving systems can be improved.

The Third Embodiment

Figure 6:
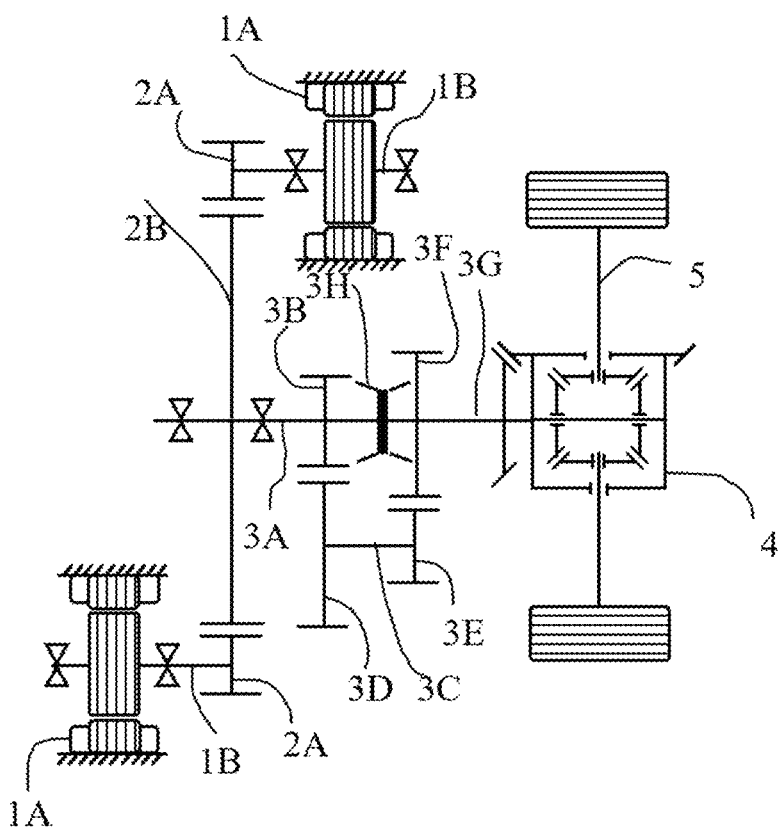
FIG. 6 is a schematic structural view of the drive box combined with flexible torque of multi motors according to a third embodiment of the present disclosure.

As shown in FIG. 6, the difference between the third embodiment and the second embodiment is that multiple power sources 1 are distributed in an opposite arrangement. The opposite arrangement means that a part of the driving motors 1A are distributed in front of the reduction gear assembly 2 and another part of the driving motors 1A are distributed in the rear of the reduction gear assembly 2. For example, for two power sources 1, one of the two power sources 1 is distributed in front of the reduction gear assembly 2 and the other of the two power sources 1 is distributed behind the reduction gear assembly 2. In this way, other components or systems of the vehicle can be installed on the idle side in front of the reduction gear assembly 2, to meet the arrangement for the whole vehicle system.

The Fourth Embodiment

Figure 7:
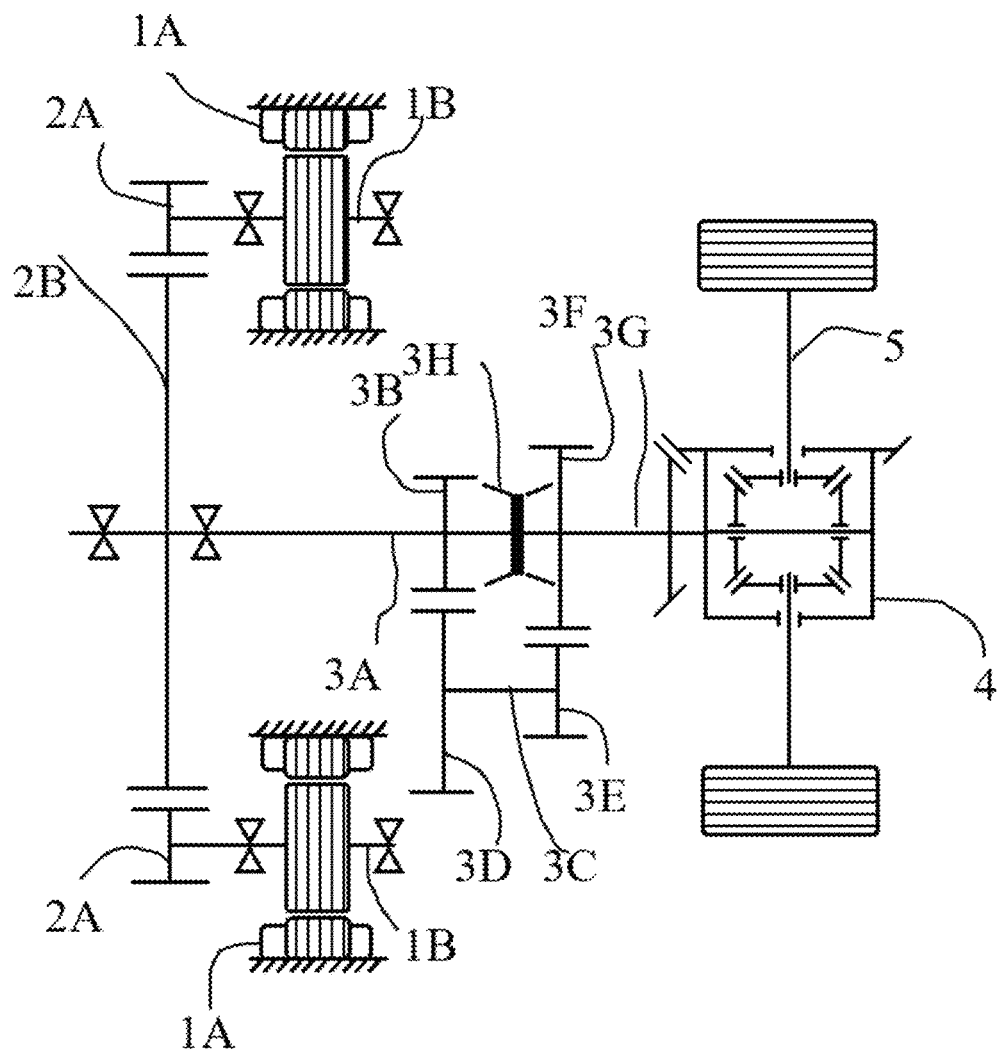
FIG. 7 is a schematic structural view of the drive box combined with flexible torque of multi motors according to a fourth embodiment of the present disclosure.

As shown in FIG. 7, the difference between the fourth embodiment and the second embodiment is that the plurality of power sources 1 are distributed in a backward arrangement. The backward arrangement means that all the driving motors 1A are distributed behind the reduction gear assembly 2. In this way, the space along the axial length of the vehicle can be saved, and other components or systems can be installed in the space along the axial direction of the vehicle, to meet the system layout of the whole vehicle.

Based on the same technical concept, an embodiment of the present disclosure also provides an electric vehicle. The electric vehicle includes the drive box combined with flexible torque of multi motors described in any embodiment or the combination of embodiments above. The electric vehicle includes, but is not limited to, a pure electric heavy truck, a heavy truck with increased range, a battery replacement heavy truck, and the like.

Further, an embodiment of the present disclosure further provides a battery replacement heavy truck. The battery replacement heavy truck includes a battery replacement box, and the battery replacement box can be quickly replaced through a battery replacement station.

According to any one of the above embodiments or a combination of multiple embodiments, the following beneficial effects can be achieved.

The drive box combined with flexible torque of multi motors provided in the embodiment of the present disclosure not only can meet the requirements with a large torque under a low speed condition, but also can ensure the power performance of the vehicle at a medium or high speed. The motor with multiple groups of small torques and a high rotational speed is provided in the drive synthesis box with multi-motors flexible torque, which can reduce manufacturing costs. By using a two-gear shift device, the power interruption can be reduced as much as possible and the driving comfort can be improved. The dual-motor controller may cooperate with the single-motor controller, thereby reducing the manufacturing cost of the motor controller. Further, each driving motor is configured to operate in different time periods, which makes the accumulated damage of the driving motors shared between each driving motors. In addition, when a single driving motor fails, the vehicle can still be driven normally through other driving motors, which improves the reliability of the electric driving system.

Various specific details are described in the present description. However, it should be understood that embodiments of the present disclosure may be implemented without these specific details. In some embodiments, the well-known methods, structures and technologies are not shown detailedly in order not to obscure the understanding of the present description.

It should be noted that the above embodiments are only used to illustrate the technical solutions of the present disclosure, and do not limit the present disclosure. Although the present disclosure has been described in detail with reference to the foregoing embodiments, those skilled in the art should understand that under the inventive concept of the present disclosure, modifications or equivalent transformations can be made according to part or all the technical solutions of the present disclosure, and these modifications or equivalent transformations do not make the corresponding technical solutions deviate from the scope of the present disclosure.

What is claimed is:

1. A drive box combined with flexible torque of multi motors, comprising:
    at least two power sources, wherein each of the at least two power sources comprises a driving motor for outputting a driving force; and
    at least two reduction gear assemblies, each power source is correspondingly connected to one of the at least two reduction gear assemblies, wherein the two reduction gear assemblies are configured to transmit the driving force;
    wherein one of the at least two power sources is provided at one side of a straight line connecting the at least two reduction gear assemblies, and the other of the at least two power sources is provided at the other side of the straight line.

2. The drive box combined with flexible torque of multi motors of claim 1, further comprising a differential, wherein an input end of the differential is connected to an output end of each reduction gear assembly, and the differential is connected to a left driving shaft and a right driving shaft for transmitting the driving force to a respective wheel end, to drive a respective wheel of a vehicle.

3. The drive box combined with flexible torque of multi motors of claim 2, further comprising a transmission connecting the input end of the differential with the output end of each reduction gear assembly.

4. The drive box combined with flexible torque of multi motors of claim 3, wherein:
each power source comprises the driving motor and a motor shaft connected to the driving motor;
each reduction gear assembly comprises a first transmission gear connected to the motor shaft and a second transmission gear meshing with the first transmission gear; and
the second transmission gear is an output end of the reduction gear assembly.

5. The drive box combined with flexible torque of multi motors of claim 4, wherein the at least two reduction gear assemblies share one and the same second transmission gear.

6. The drive box combined with flexible torque of multi motors of claim 5, wherein the at least two power sources are provided along a circumference of the second transmission gear.

7. The drive box combined with flexible torque of multi motors of claim 4, wherein:
the transmission comprises an input shaft assembly, an intermediate shaft assembly, an output shaft assembly and a gear shift device,
the input shaft assembly comprises an input shaft connected to the second transmission gear and a third transmission gear connected to the input shaft,
the intermediate shaft assembly comprises an intermediate shaft, a fourth transmission gear and a fifth transmission gear, both ends of the intermediate shaft are respectively connected to the fourth transmission gear and the fifth transmission gear, and the fourth transmission gear meshes with the third transmission gear,
the output shaft assembly comprises an output shaft and a sixth transmission gear, the output shaft is connected to the input end of the differential, the sixth transmission gear is rotatably installed on the output shaft, and the sixth transmission gear meshes with the fifth transmission gear, and
the gear shift device is provided on the output shaft and configured to control a connection between the output shaft and the sixth transmission gear or the input shaft.

8. The drive box combined with flexible torque of multi motors of claim 7, wherein:
when the transmission operates in a first gear, the gear shift device is configured to control the output shaft to connect with the sixth transmission gear, to make the driving force transmitted from the reduction gear assembly sequentially pass through the input shaft, the third transmission gear, the fourth transmission gear, the intermediate shaft, the fifth transmission gear, the sixth transmission gear and the output shaft to the differential; and
when the transmission operates in a second gear, the gear shift device is configured to control the output shaft to connect with the input shaft, to make the driving force transmitted from the reduction gear assembly sequentially pass through the input shaft and the output shaft to the differential, to realize a two-gear driving of the vehicle.

9. An electric vehicle, comprising the drive box combined with flexible torque of multi motors of claim 1.

10. The electric vehicle of claim 9, wherein the electric vehicle comprises a pure electric heavy truck, a heavy truck with increased range, and a battery replacement heavy truck.

11. The electric vehicle of claim 10, wherein the battery replacement heavy truck comprises a battery replacement box, and the battery replacement box is quickly replaced through a battery replacement station.

* * * * *